(12) United States Patent
Wolf et al.

(10) Patent No.: US 10,278,542 B2
(45) Date of Patent: *May 7, 2019

(54) HAND BLENDER BLADE WITH MILLING EDGE

(71) Applicant: De'Longhi Braun Household GmbH, Neu-Isenburg (DE)

(72) Inventors: Jurgen Wolf, Kriftel (DE); Christian Stenglein, Frankfurt am Main (DE); Sabine Buhl-Remmel, Schwalbach am Taunus (DE); Christian Dexheimer, Langen (DE); Christof Kleemann, Bad Homburg (DE)

(73) Assignee: DE'LONGHI BRAUN HOUSEHOLD GMBH, Neu-Isenburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/568,530

(22) PCT Filed: Apr. 18, 2016

(86) PCT No.: PCT/EP2016/058531
§ 371 (c)(1),
(2) Date: Jan. 29, 2018

(87) PCT Pub. No.: WO2016/169885
PCT Pub. Date: Oct. 27, 2016

(65) Prior Publication Data
US 2018/0160857 A1    Jun. 14, 2018

(30) Foreign Application Priority Data

Apr. 21, 2015   (DE) .................. 10 2015 207 197

(51) Int. Cl.
*A47J 43/07*    (2006.01)
*A47J 43/044*   (2006.01)
(Continued)

(52) U.S. Cl.
CPC ....... *A47J 43/0711* (2013.01); *B01F 7/00275* (2013.01); *B01F 7/00608* (2013.01);
(Continued)

(58) Field of Classification Search
CPC .......... A47J 2043/04427; A47J 43/0755; A47J 43/0711; A47J 43/082; A47J 43/06;
(Continued)

(56) References Cited

U.S. PATENT DOCUMENTS

| 1,412,401 A | | 4/1922 | Gotfredsen |
| 4,405,998 A | * | 9/1983 | Brison ................ A47J 43/0755 366/129 |

(Continued)

FOREIGN PATENT DOCUMENTS

| CN | 203506469 U | 4/2014 |
| DE | 1037088 B | 8/1958 |

(Continued)

OTHER PUBLICATIONS

English Translation of the International Preliminary Report on Patentability of the International Searching Authority, dated Nov. 21, 2017, with respect to International Application No. PCT/EP2016/058531.

(Continued)

*Primary Examiner* — Charles Cooley
(74) *Attorney, Agent, or Firm* — Scott R. Cox

(57) ABSTRACT

A hand blender containing a blade arrangement for a domestic appliance for cutting and comminuting food containing a rotatable blade with a hub which lies at a center of rotation of the blade for receiving a shaft. The blade includes at least one cutter which extends radially and which has a cutting edge that lies on a front side in the rotational direction and defines a circular cutting zone when circulating. The blade also includes a milling rib which protrudes upwards from the (Continued)

blade in an axial direction and is oriented so as to produce a milling effect when circulating and defines a corresponding milling zone that extends from the hub to the cutting zone of the cutter.

15 Claims, 6 Drawing Sheets

(51) Int. Cl.
*B01F 7/00* (2006.01)
*B01F 13/00* (2006.01)

(52) U.S. Cl.
CPC ........ *B01F 7/00616* (2013.01); *B01F 13/002* (2013.01); *A47J 43/0722* (2013.01); *A47J 2043/04427* (2013.01); *B01F 2215/0014* (2013.01); *B01F 2215/0422* (2013.01)

(58) Field of Classification Search
CPC .......... A47J 2043/04409; A47J 43/0705; A47J 43/0722; A47J 43/07; B01F 13/002; B01F 7/00616; B01F 7/00275; B01F 2215/0014; B01F 2215/0422
USPC .................................................. 366/129, 331
See application file for complete search history.

(56) References Cited

U.S. PATENT DOCUMENTS

| | | | | |
|---|---|---|---|---|
| 5,647,546 A * | 7/1997 | Sinovas | ............... | A47J 43/0711 241/282.2 |
| 5,810,472 A * | 9/1998 | Penaranda | ........... | A47J 43/0711 220/601 |
| 5,836,684 A | 11/1998 | Safont et al. | | |
| 5,863,118 A * | 1/1999 | Ackels | ................. | A47J 43/0711 366/129 |
| 6,293,691 B1 * | 9/2001 | Rebordosa | ........... | A47J 43/0711 366/129 |
| 7,866,879 B2 * | 1/2011 | Moschetti | ............ | A47J 43/0711 366/129 |
| 8,033,712 B2 * | 10/2011 | Calange | .............. | A47J 43/0705 366/129 |
| 8,038,338 B2 * | 10/2011 | Maleiro Vilarino | ........................ | A47J 43/0705 366/129 |
| 8,454,223 B2 * | 6/2013 | Lameiro Vilarino | ........................ | A47J 43/0705 366/129 |
| 8,556,203 B2 | 10/2013 | Unteregger et al. | | |
| 10,071,448 B1 * | 9/2018 | Jacobsen | ............. | B01F 7/00275 |
| 2008/0198693 A1 * | 8/2008 | Lameiro Vilarino | ........................ | A47J 43/0705 366/286 |
| 2011/0101138 A1 * | 5/2011 | Unteregger | ........... | A47J 43/042 241/36 |
| 2018/0116464 A1 * | 5/2018 | Wolf | ........................ | A47J 43/06 |
| 2018/0160857 A1 * | 6/2018 | Wolf | .................... | A47J 43/0711 |

FOREIGN PATENT DOCUMENTS

| | | |
|---|---|---|
| DE | 1219640 B | 6/1966 |
| DE | 1224006 B | 9/1966 |
| EP | 1900315 A1 | 3/2008 |
| EP | 1982624 A2 | 10/2008 |
| EP | 2127577 A1 | 12/2009 |
| EP | 2351501 A1 | 8/2011 |
| ES | 2005071 A6 | 3/1989 |
| JP | H11-206582 A | 8/1999 |
| JP | 2000-051103 A | 2/2000 |
| WO | 2012044306 A1 | 4/2012 |
| WO | WO2013016533 A1 | 1/2013 |
| WO | WO2013020571 A1 | 2/2013 |
| WO | WO2014022876 A1 | 2/2014 |
| WO | WO2014049329 A1 | 4/2014 |

OTHER PUBLICATIONS

International Search Report with Written Opinion of the International Searching Authority, dated Jul. 15, 2016, with respect to International Application No. PCT/EP2016/058531—cited only for references that are disclosed therein.

* cited by examiner

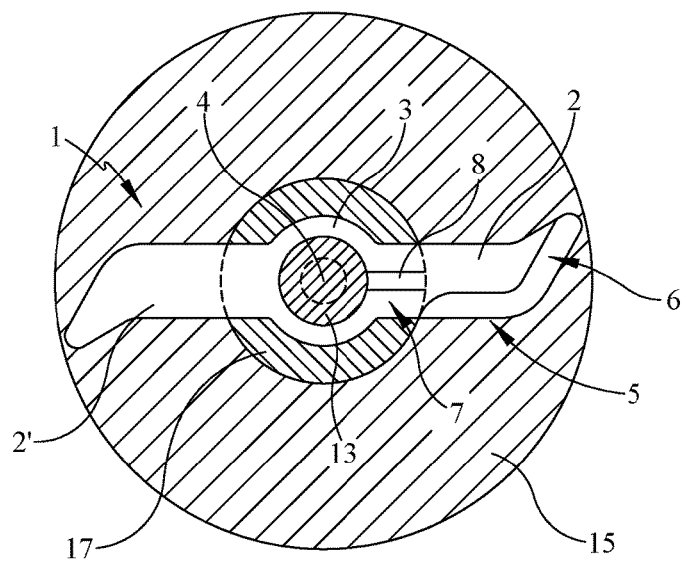
*FIG. 1a*
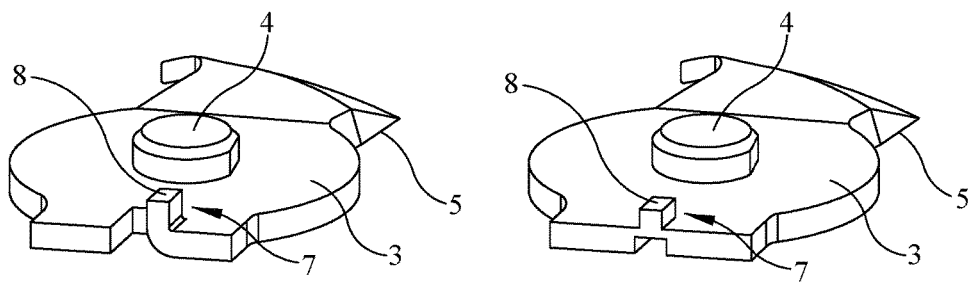
*FIG. 1b*  *FIG. 1c*

HAND BLENDER BLADE WITH MILLING EDGE

The present invention relates to a blade arrangement for a domestic appliance for cutting and comminuting food and a corresponding domestic appliance, in particular a jug blender and a hand blender.

Hand blenders are generally fitted with a rapidly rotating blade to mix liquids and comminute solid food. The blades are made from sheet metal and have two or more sharp cutters. In some appliances, the individual cutters can be angled out of the rotational plane in a similar or different manner and may be axially offset relative to each other. Examples of this are appliances or blade arrangements such as described in DE 197 50 813 A1.

The comminution of solid food is predominantly executed by the sharp cutting edges of the cutters. However, efficient comminution can only occur if the solids cross the cutting zone of the cutting edges. This always happens if the solids do not exceed a certain size and are advantageously moved into or through the cutting zone by a stream of liquid. In the above-mentioned blade arrangements with angled cutters, the cutting zones of the respective cutters are inclined to the rotational plane in keeping with their angulation. This means that, in the case of cutters that are set at different angles or are axially offset in parallel, each cutter then has its own cutting zone.

The central zone of most blades is relatively flat and has no exposed areas in the rotational direction, with which to process solids. Blades that have folded elements near the centre are known. Examples are given in WO 2014/022876 A1, WO 2013/016533 A1 or CN 203506469 U. However, if one looks at the effective rotatory area of these folds, one can see that it has a thin annular shape and that the main area of the central zone is smooth. Therefore no cutting or material ablation and hence no comminution occurs in this central zone, which is "passive". Now, if the solid food is big enough to fully or partially run into the central zone of the blade, the respective cutting zones of the cutter are then directly on top of the food and so are not able to cut it up, since the blade and therefore the entire hand blender is axially blocked in the direction of thrust through the smooth central zone. Due to the design, it is effectively not possible to extend the cutting edges of the above-mentioned known blade arrangements into the passive central zone, since, close to the shaft, the angle between the attack direction of the cutter edge, that is to say the normals on the edge, and the rotational direction of the edge is nearly 90°, so that no cutting effect can be achieved there. Cutting speeds are also low near the centre. In such cases, the user usually increases the compressive force and tries to squash and deform the solid food so that the cutter can penetrate it. This is onerous, time-consuming and even renders certain applications completely impossible. Even if, in some blade arrangements, folded elements are arranged near the centre of rotation of the blade, as in CN 203506469 U, these are oriented in the tangential direction (they extend in the direction of rotation) and cut a thin-walled annular shape in the food. Accordingly, this likewise fails to achieve any ablation of the food in the vertical direction over an area. Moreover, the food becomes clogged in the passive central zone. Finally, a comminuting device comprising a non-rotating annular cutter provided with blades bent upwards at approximately 45° and a rotating cutter arranged underneath it is known from DE 1 037 088 A. DE 698 26 868 T2 discloses a hand blender with flat mixing blade and extendable stem.

OUTLINE OF THE INVENTION

In order to overcome the above-mentioned disadvantages, the problem of the present invention is to "activate" the "passive" central zone as much as possible, that is to say to convert it completely or in part into a material (food) comminuting zone. The invention solves this problem by a blade arrangement or a jug or hand blender. Advantageous embodiments are disclosed in the subclaims.

The blade arrangement according to the invention for a domestic appliance for cutting and comminuting food comprises a rotatable blade with a hub which lies at the centre of rotation of the blade for receiving a shaft, the blade comprising at least one cutter which extends radially and which has a cutting edge that lies on the front side in the rotational direction and defines a circular cutting zone when rotating, characterised in that the blade has a milling rib which protrudes upwards from the blade in an axial direction and is oriented so as to produce a milling effect when rotating and defines a corresponding milling zone that extends from the hub to the cutting zone of the cutter. The milling zone and the cutting zone are directly adjacent to each other so that there are no passive zones between them. Thus the cutting zone defined by rotation of the cutting edge is extended inwards towards the hub by a milling zone, thereby collectively enlarging the active comminution zone in comparison to conventional blades. The basic idea is that the cutting zone only extends radially inwards to a certain point, so that an acceptable cutting speed can still be achieved, and the milling zone defined by the milling rib then follows immediately on from it. The milling zone preferably extends as far as the cutting zone of the cutter, without substantially overlapping said zone. Since it is not possible to draw an exact and clear delineation between the (radially inner) end of the cutting zone and the (radially outer) end of the milling zone due to the structural transition from the cutting edge to the milling rib, "no overlapping" of the two zones is to be understood to mean that the cutting zone defined by the still unmodified cutting edge (before the transition) and the milling zone defined by the still unmodified milling edge (before the transition) do not overlap. In other words, the milling zone merges into the cutting zone in the sense that the milling effect of the milling rib diminishes to zero at the transition and the cutting effect of the cutting edge starts to increase from zero.

Due to its extension, the milling edge protruding axially out of the cutter is not oriented substantially along a tangent to the rotational direction of the blade, as in the folded elements of the prior art, that is to say with an attack direction oriented substantially perpendicular to the rotational direction, but has attack directions, at least in regions along its extension, which form a sharp angle ("angle of attack") of 45° or less, preferably 35° or less, to the rotational direction. In the field of cutting blades, the direction of attack is understood to mean the normal to the striking edge or striking surface, that is to say the direction in which the striking edge (cutting edge) of a blade meets the material being cut, for example the angle between the direction of attack and the direction of rotation of a radially running edge is 0°. In the milling rib, the attack surface is the side face of the milling rib pointing in the rotational plane. The cutting edge preferably has an attack angle of 45° or less, particularly preferably 35° or less, along its entire extension.

The present invention defines a cutting edge to be a horizontally cutting edge of the cutter, which is therefore able to make cuts in the rotational plane. The cutting edge is created in that the blade metal is deep drawn at a (deep drawing) angle of 20°, for example, and then sharpened by grinding. The grinding is done in the rotational plane of the blade, so that the said angle therefore determines the so-called wedge angle of the blade, that is to say the angle between the rotational plane and a (top or bottom) surface of the cutting edge.

The axial direction is a direction perpendicular to the rotational plane of the cutter. Within the scope of the present invention, the hub is that region of the blade which receives the shaft in a receiver, so, for example, comprises an opening or mounting option for inserting and fastening the shaft, and also the region immediately surrounding the receiver, which is necessary for the structural strength of the connection of driveshaft to blade/cutter. In the known blades, this region is mostly a circular area, from which the cutter or cutters extend substantially radially but, according to the present invention, can also have geometries that differ from the circular form.

The blade arrangement according to the invention extends the functionality of the blade in a very advantageous manner. In addition to cutting with the sharp cutting edges of the cutter of the blade in the circumferential direction, there is also an efficient milling functionality of the milling rib in the compression direction. This in turn enables the cutter to cut solid food more efficiently and more quickly. The effect of the blade arrangement according to the invention is based on the fact that solid foods can be milled by light pressure and rotation, so that the cutting zones of the cutter can be pushed further into the food. This is made possible by the novel arrangement of the milling rib making the "passive" central zone as small as possible. Even with blades with a milling rib only running on one side (that is to say a milling rib only provided on one cutter), as a result of the extension of the milling rib from the hub to the cutting edge, only a very small passive zone is left around the receiver for the shaft and the effective area of this zone is a circular area of extremely small diameter. The compressive force necessary to penetrate into the food is therefore likewise correspondingly low.

Provision is preferably made for the milling rib to run so that its attack angle is between 0° and 35°. For example, the attack angle at the inner end of the milling edge is 35° and decreases towards the outside. An optimum milling effect can be achieved with such attack angles and there are relatively few restrictions on the positioning of the milling edge on the cutter or on the hub. For example, it is possible for the milling rib to run substantially radially in the rotational plane of the blade. In this way, the attack angle of the milling edge is practically 0°, so that it has the greatest possible milling effect. These measures guarantee a highly efficient blade arrangement that can penetrate into very solid food without a lot of effort.

In a preferred embodiment, the blade comprises two cutters opposite each other and the milling rib runs over the centre of rotation of the blade. This configuration has the advantage that practically no passive central zone is left, since the milling zone takes in the entire area inside the annular cutting zone. Moreover, the highly visible milling rib running radially on both sides makes the blade arrangement stand out from conventional blade arrangements and this can have a promotional effect on sales.

According to a particularly preferred embodiment, the milling rib extends from a position on the edge of the hub, which substantially lies at an angle of preferably 45° to the radial central axis of the cutter relative to the centre of rotation, up to the cutting edge. The milling rib therefore acts as an extension of the cutting edge. Due to the fact that the milling rib starts from a position rotated by 45° from the extension of the blade cutter and then extends along the edge of the hub and the front edge of the cutter to the cutting edge, the attack angle decreases along the milling rib from nearly 90° at the inner end of the rib outwards and drops below 45° before the milling rib reaches the cutting edge, which means that, although the milling effect is slightly less than that of the radially oriented rib with an attack angle of substantially 0°, the risk of the food being entrained in rotation is eliminated. This therefore guarantees an efficient milling of the food. Moreover, areas in which food residues could collect (e.g. corners or small gaps of a few millimeters between milling edge and cutting edge) are avoided, thereby making the blade easier to clean. Finally, the eccentric arrangement of the milling edge relative to the centre of rotation allows larger pieces of food to be conveyed outwards into the cutting zone, where they can be cut up more efficiently.

It has proved to be advantageous in this embodiment for the wedge angle between the rotational plane and a surface of the cutter to increase continuously from the cutting edge to the milling rib from 20° to 90°. This can be achieved by increasing the deep drawing angle in the region of the milling rib to a maximum of 90°. This allows the resulting grinding area to be as thin as possible, hence increasing the milling effect.

In a particularly preferred embodiment of the blade arrangement, the milling rib is arranged on the back side of the cutter in the rotational direction. This has technical manufacturing advantages, since the milling edge is bent up on one side of the sheet metal blank forming the cutter, which is away from the cutting edge side, so that the corresponding area is not compromised by the bending up process. Once again, this avoids corners in which food residues could collect and the blade arrangement is easy to clean. Moreover, due to the spatially separated design, the milling rib can be ground separately from the cutting edge as a folded tongue of sheet metal during manufacture. Finally, the eccentric arrangement of the milling rib once again allows larger pieces of food to be conveyed outwards.

It is preferred that the cutting edge and the milling rib have the smallest possible projecting surface in the compression direction, in order to minimise the force required for vertical penetration into the food. In this case, the compression direction is the direction in which the user presses the hand blender down into the food.

In order to minimise the contribution of the milling rib to the grinding surface, the thickness of the milling rib (in the rotational plane) preferably corresponds to the thickness of the sheet forming the blade. This is achieved, for example, by bending the milling rib out of the blade metal. Milling ribs bent in this way also have the advantage that they do not require any additional parts and do not require any significant changes in the production process relative to conventional cutters.

Finally, the cutting edge advantageously has a sharp wedge angle of less than 45°, particularly preferably 20°, whereby the cutting edge can cut particularly efficiently in the rotational plane. The wedge angle is the angle between the rotational plane and a (top or bottom) surface of the cutting edge and is obtained as already described above.

The invention envisages advantageously incorporating the above-mentioned blade arrangement into a jug blender.

However, the blade arrangement according to the invention is especially suitable for incorporating into a hand blender. A hand blender according to the invention therefore comprises the above-mentioned blade arrangement. Furthermore, it is particularly preferred that the hand blender comprises a drive motor arranged in a motor housing, a stem in which the shaft that can be connected to the drive motor in a rotationally rigid manner is mounted, and is subdivided into an inner and an outer assembly, wherein the outer assembly has a shield at the end furthest away from the motor housing, which encircles the blade that is fixed to the shaft, said shaft being inserted into the inner assembly in an axially rigid manner and the inner assembly being axially movable relative to the outer assembly.

Hereinafter the direction pointing from the drive part of the motor housing is also referred to as "up" and the opposite direction as "down".

The stem according to the invention is therefore substantially divided into two parts or two assemblies, an inner and an outer assembly. The inner assembly serves as a "solid" interface to the known motor housing and performs additional functions, which are described below. The outer assembly comprises most of the external geometry, as well as the shield at the bottom end, for example in the form of a so-called bell. This assembly also performs additional functions. Due to the fact that the outer assembly is axially movable relative to the inner assembly, the stem is designed like a telescope, which can also characterise its external appearance, for example in the top third of the external geometry. This telescopic construction allows at least part of the inner assembly to "plunge" into the outer assembly.

The blade arrangement is firmly connected to the drive shaft in the usual way, thereby transferring the rotation of the motor to the cutter. Due to the axial duct inside the inner assembly, the connection between the driveshaft and the motor remains constant throughout operation and no axial movement is possible between the inner assembly and the driveshaft. However, since the outer assembly can move relative to the inner assembly, this movement also acts between the bell and the cutter.

In the existing prior art, the fixed axial position of the blade arrangement relative to the shield or the bottom end of the stem was a compromise to equalise performance in liquid and solid substances as far as possible. The consequence of this is that maximum performance could not be achieved in either of these operating situations and the above-mentioned disadvantages had to be taken into account. The hand blender according to the invention for stirring and comminuting food allows a greater distance of the blade arrangement (of the cutter) from the bottom edge of the shield (e.g. bell) and this serves to reduce the suction effect in liquid foods and their tendency to splash. However, if the user wishes to increase the cutting performance in solid foods or to reach unprocessed parts of the food, they can exert pressure on the hand blender in the usual way. However, in contrast to the prior art, when the user does so, the inner assembly pushes into the outer assembly so that the blade arrangement, which is immovably mounted in the inner assembly, is exposed further down relative to the shield, so that it is more able to penetrate into the food being processed and can even reach pieces that are right up against the bottom of the container and process them.

The hand blender according to the invention is further characterised by its simple design, straightforward use and easy cleaning.

The driveshaft is preferably mounted in the inner assembly via an axial bearing and the force is transmitted from the axial bearing to the driveshaft via a locking device attached to the driveshaft. This can consist of a U-shaped washer and a rolling ("Rollung" in German), for example, preferably provided underneath the axial bearing, but also of other types of locking device known to a person skilled in the art. Rolling is a method of producing a form fit on the level of the driveshaft diameter (similar to a shaft circlip). This involves constricting the driveshaft at one point by means of a "pointed" roll that rotates in parallel. The material displaced in front of and behind the constriction builds up over the shaft diameter, so that it no longer fits through the relatively close-fitting U-shaped washer. This ensures in an easy-to-implement manner that no axial movement is possible between inner assembly and shaft.

It is also advantageous for the outer assembly to have a radial side bearing for the shaft at the end furthest from the motor housing, said slide bearing preferably being braced against the outer assembly in a flexible bushing. A radial bearing of this type is, for example, a slide bearing bushing (particularly a bronze one), which has no axial function and therefore provides sliding bearing in the axial direction. Thus the bearing can absorb the bearing forces most efficiently in the immediate vicinity of the working part, where the applied torque is at its maximum. Due to the flexibility of the bushing, the bearing assembly that bears the shaft so that it is radially fixed and slides axially in the lower part of the outer assembly is able to compensate for normal manufacturing tolerances. Moreover, this "soft bearing" reduces the noise generated in operation, since this connection does not transmit the vibrations to the outer assembly via "hard" components, which would then increase the amount of noise.

It is further preferred that an elastic element be provided between the inner and the outer assembly to axially pretension the outer assembly relative to the inner assembly.

BRIEF DESCRIPTION OF THE DRAWINGS

FIG. 1a shows a plan view from underneath and FIGS. 1b and 1c each show perspective views of a blade arrangement with a unilateral, radial arrangement of the milling rib according to a first embodiment of the invention;

FIG. 5 shows a perspective view of the underside of a fifth embodiment of the blade arrangement, in which the milling rib is taller than in FIG. 4a.

DETAILED DESCRIPTION

Figure 2:
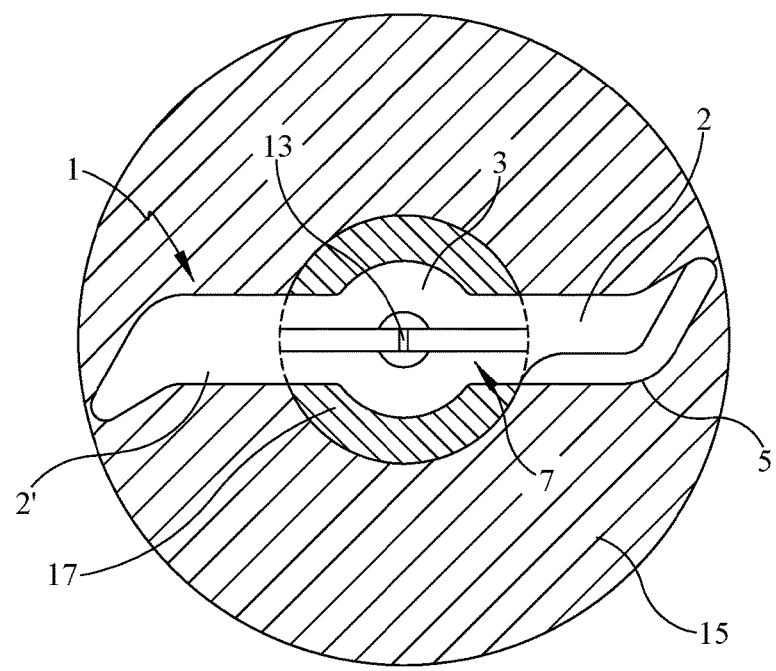
FIG. 2 is a plan view from underneath of a second embodiment of the invention with a milling rib running radially across the centre of the blade.

A first embodiment of the blade arrangement according to the invention is described with reference to FIGS. 1a, b, c. Such a blade arrangement is used in a hand blender and is driven by the electric motor of the hand blender via a shaft. The blade arrangement rotates in a rotational plane illustrated by the drawing plane of FIG. 1a. The blade arrangement according to the invention comprises a blade 1 with two diagonally opposed cutters 2, each of which has a cutting edge ground at a wedge angle of 20°. The cutters 2, 2' are angled out of the rotational plane, cutter 2 downwards and cutter 2' upwards, the indications of position relating to the cutter in its operational state being "upside down" compared with the figures. On the right-hand cutter in FIG. 1a, one can see the grinding surface 6, which is turned downwards in operation and upwards in the drawing, while the grinding surface of the left-hand cutter is turned up (and down in the drawing) and is consequently not visible in this plan view from underneath. In the centre of the blade 1 is the hub 3, mounted in the central bore of which is an axial shaft 4, which transmits the rotation generated by the motor of the hand blender to the blade arrangement. The blade 1 itself is made from a 2-mm-thick sheet, for example, and is usually made of metal. Ceramic is also an option as a material for a blade of this type.

On the right-hand cutter, a milling rib 7 protrudes downwards, said milling rib being a substantially rectangular punch-out of the sheet forming the blade that is bent into the vertical (FIG. 1b). When rotating, the milling rib 7 defines an annular milling zone 17 that extends from the hub to the cutting zone 15, which in turn is defined by the cutting edge 5 of the cutter 2 when rotating. Only a very small passive central zone 13, in which the food is not ablated or cut, remains in the centre of the annular milling zone 17. Due to the minimal size of this passive central zone 13, it only requires a small amount of force to press the blade arrangement into the food when comminuting it.

As can be seen from the perspective view of FIG. 1b, the milling rib 7 is an angled tongue punched out of the plane of the sheet forming the blade 1, said angled tongue thus extending in a substantially axial direction out of the rotational plane (cutting plane) of the blades. According to FIG. 1c, a milling rib 7 of this kind can also be formed by pressing the plate in the region of the hub 3. It is also possible for the milling rib to extend not only on one of two cutters shown here but to be formed on the other cutter 2' (left-hand cutter in FIG. 1a) as well.

In an advantageous embodiment, which is shown in FIG. 2 as a plan view from underneath, the milling rib 7 runs radially over the centre of rotation of the blade 1, and so extends over both cutters 2, 2'. In this embodiment, the passive central zone (only indicated as item 13 in the drawing) disappears, so that the compressive force to be applied to penetrate into the food to be comminuted is now only a function of the grinding surface of the milling rib, which is very small. In this case, the milling rib can be formed by a plate welded onto the blade. Said plate can be rectangular but it is also possible for the axial height of the milling rib 7 to decrease from the centre of rotation towards the outside.

Figure 3A:
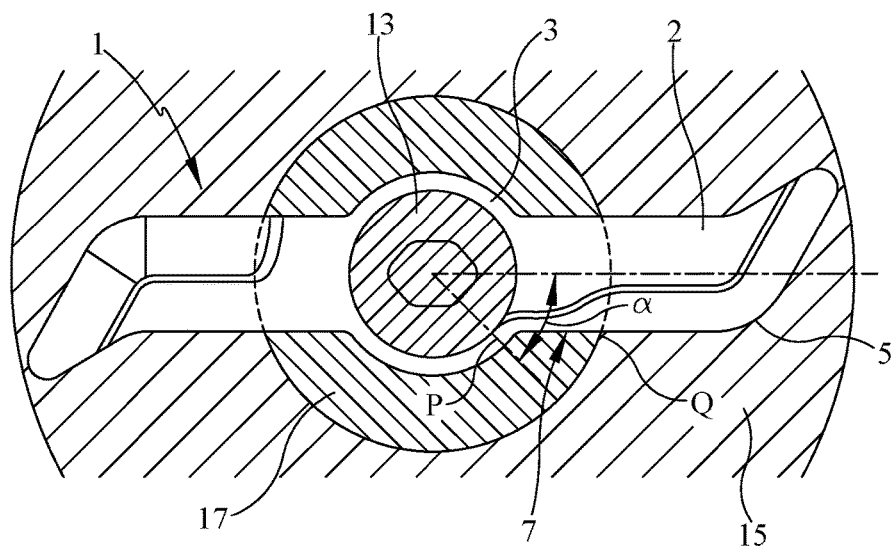
FIGS. 3a and 3b show a perspective view and a plan view from underneath of a blade arrangement with a milling rib running towards the hub in the extension of the cutting edge according to a third embodiment of the invention.
Figure 3B:
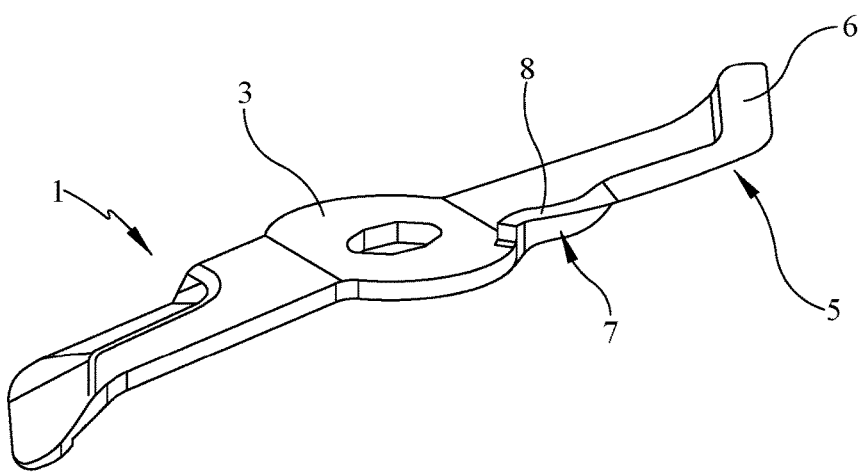

In a preferred embodiment, which is illustrated in FIGS. 3a and 3b, the axially protruding milling rib 7 is not radial but is arranged in the extension of the cutting edge 5, said milling rib starting at a position P turned away from the extension of the cutters 2, 2' by α=45° and then running tangentially along the edge of the hub 3 (of the plate forming the hub) and then along the leading edge of the cutter 2 to the inner end of the cutting edge 5. This orientation of the milling rib 7 means that the attack angle at the position P is almost 90° (normal on the "forwards" facing surface of the milling rib is perpendicular to the direction of rotation) and then decreases to approximately 20° by the point Q on the inner end of the cutting edge.

The axially turned grinding surface 8 of the milling rib 7 and the axially turned grinding surface 6 of the cutting edge 5 together form a total grinding surface, the minimisation of which, like the minimisation of the passive central zone, helps to minimise the amount of force required for penetrating the food. On the other hand, the milling rib can be angled out of the blade sheet, as already mentioned in connection with FIG. 1b), or, as illustrated, directly punched out and ground, which, due to the minimal plate thickness (approx. 2 mm) of the sheet used to produce the blade 1, still results in a very small grinding surface 8 in both cases and hence a very small contribution to the total grinding area.

As is shown in the embodiment illustrated here, the surface of the cutting edge 5 (which forms the wedge angle with the rotational plane/grinding surface 6) continuously merges into the milling rib 7, that is to say the wedge angle in the region of the transition from the cutting zone 15 to the milling zone 17 continuously increases from the wedge angle of the cutter 2, here 20°, up to an angle of 90°, at which the milling rib 7 projects out of the rotational plane of the blade 1 (see the vertical front face of the milling rib 7 turned in the rotational direction in FIG. 3b). At the same time, the width of the grinding surface 6 of the cutting edge 5 can decrease in the rotational plane at said transition to a width corresponding to the plate thickness, which helps to minimise the total grinding area.

Figure 4A:
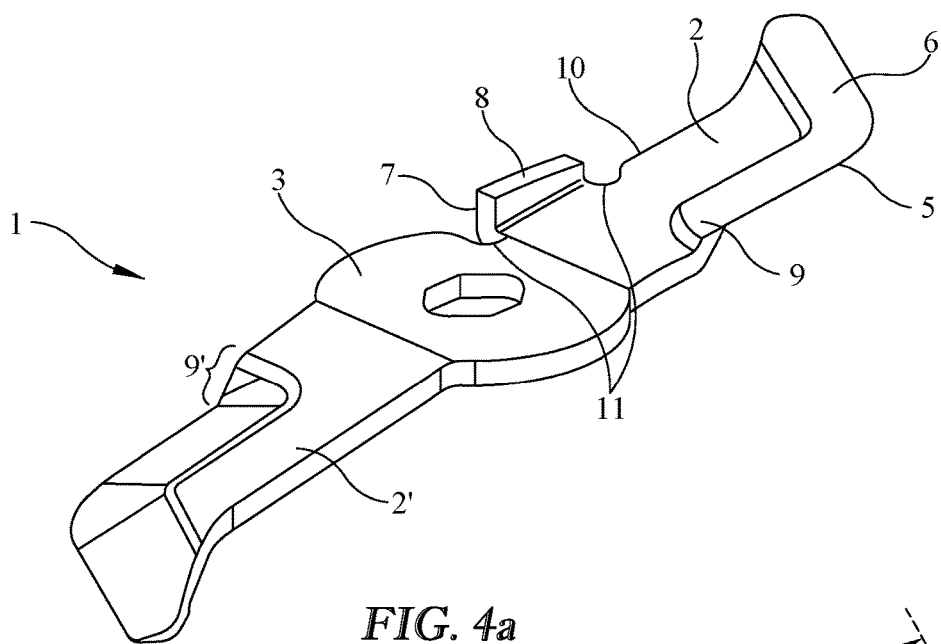
FIGS. 4a, 4b and 4c show a perspective view, a plan view from underneath and a side view of a fourth embodiment of the blade arrangement with a unilateral milling rib on the side opposite the cutting edge on the blade.
Figure 4B:
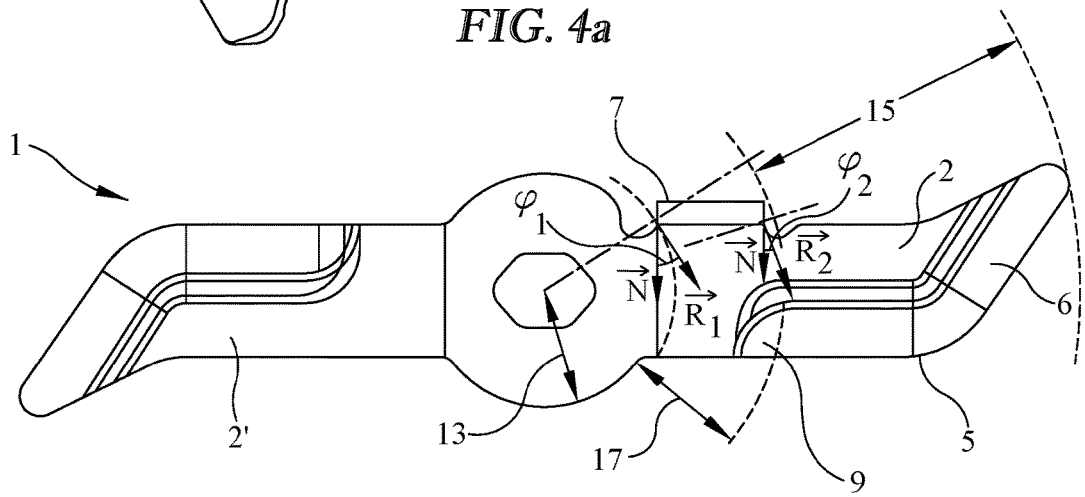
Figure 4C:
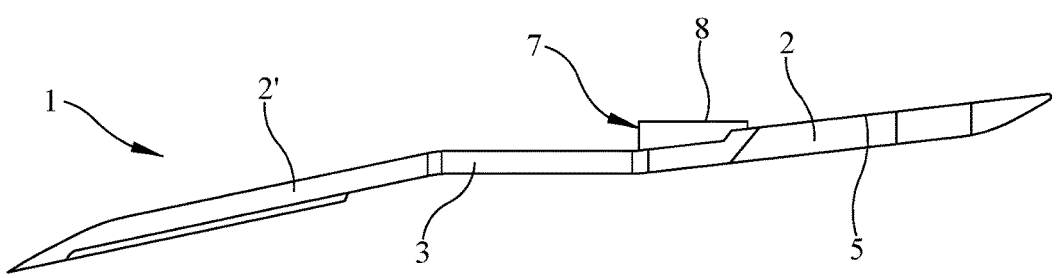

FIGS. 4a to 4c show a particularly preferred embodiment of the blade arrangement according to the invention, in which the milling rib 7 protrudes axially at the edge 10 opposite the cutting edge 5. The milling rib 7 is therefore located on the back side of the cutter 2 in the rotational direction. Since it does not run along a radius, the attack angle of the milling rib 7 is variable and is $\varphi_1=30°$ at the inner end of the rib (angle between the normals on the milling edge $\vec{N}$, and the rotational direction $\vec{R})_1$), while it decreases to $\varphi_2=15°$ at the outer end. The choice of this angle combines a good milling performance with an acceptable rotational resistance, which should not be too high, especially for solid foods. In this embodiment, in contrast to the FIGS. 3a and 3b, the axially turned grinding surface 8 of the milling rib 7 is separate from the grinding surface 6 of the cutting edge 5 and furthest away from it. As can be seen in the side view of FIG. 4c, in this case the grinding surface 8 is horizontal, i.e. extends parallel to the rotational plane of the blade arrangement, while the two cutters 2 and 2' of the blade arrangement are angled downwards or upwards respectively relative to the hub portion 3 (N. B.: shown "upside down" in the drawing).

As can clearly be seen in the plan view of FIG. 4b, the milling rib 7 is surrounded by notches 11 on the inside and outside of the blade, said notches being created by the punching tool during manufacture and preventing tearing as the milling rib is bent up due to excessively small bending radii or warping of the cutter 2. One can also see the division into zones, the radially outermost cutting zone 15 being defined by the rotation of the cutting edge 5. Following on from the unmodified cutting-edge 5 (that is to say as long as the wedge angle is substantially constant) is a transition area 9, at which the wedge angle increases from e.g. 20° of the cutting edge to 90°, as it also does in FIGS. 1 to 3. Since this region does not have any cutting effect due to the rapid increase in the wedge angle to 90°, the cutting zone 15 only extends as far as the boundary between cutting edge 5 and transition area 9, as shown in FIG. 4b. The increase in the wedge angle can also be clearly seen at the transition area 9' on the other cutter 2', which is clearly shown in FIG. 4a. In contrast, the milling zone 17 created by rotation of the milling rib 7 directly adjoins the cutting zone 15, without overlapping the cutting zone. On the inside, the milling zone 17 adjoins the passive central zone 13, which is completely defined by the hub 3 in this case.

Figure 5:
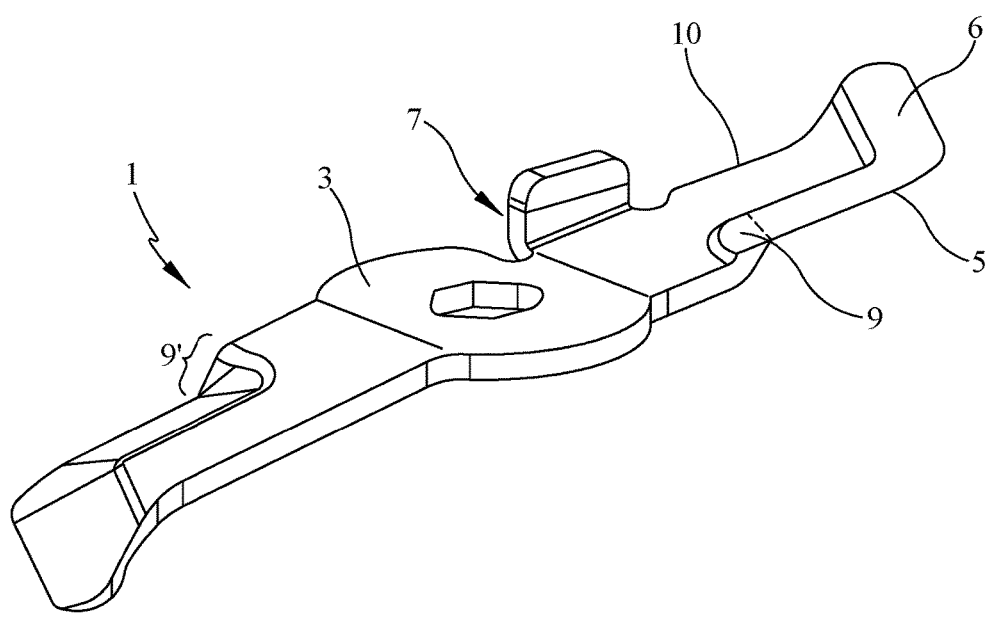

Finally, FIG. 5 illustrates an embodiment in which the milling rib 7 is extended—by means of a corresponding configuration of the punching tool. This provides a larger contact surface for bending the milling edge upwards after punching, thereby simplifying the bending process and making it more accurate.

Figure 6A:
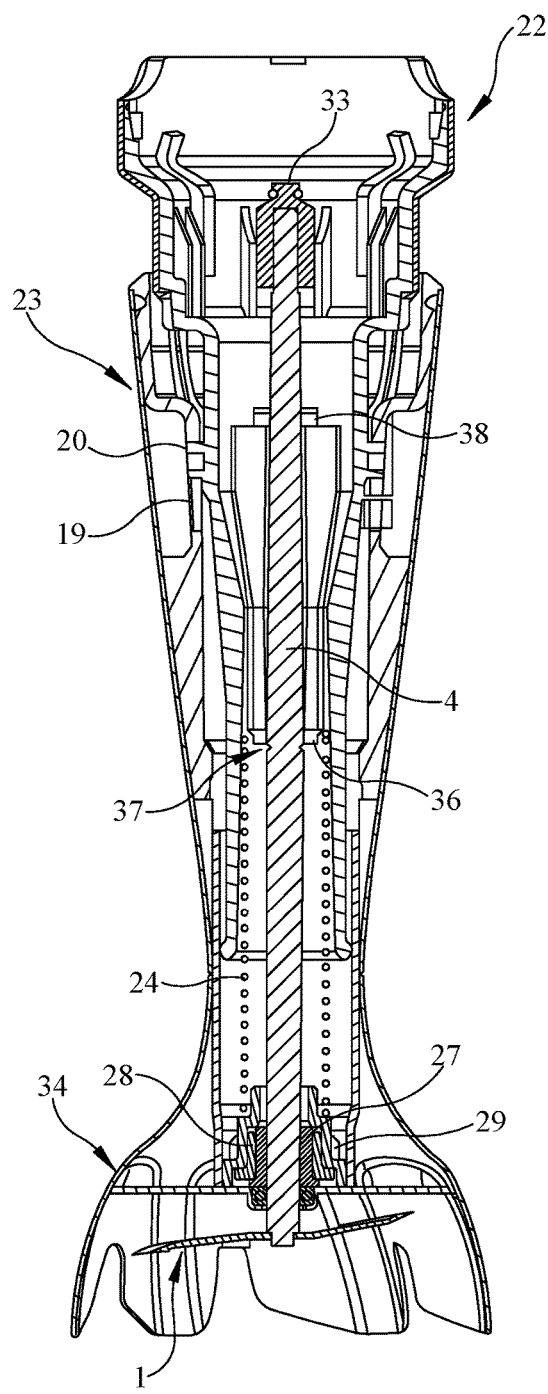
FIGS. 6a) and 6b) show cross-sectional views of the stem of the appliance according to the invention with the blade in the higher and lower position, respectively.

Finally, FIGS. 6a) and 6b) show a particularly preferred combination of the blade arrangement according to the invention with a hand blender that exhibits a stem divided into an inner assembly 22 and an outer assembly 23. The inner assembly 22 is able to move into and out of the outer assembly 23 like a telescope. As can be seen in the longitudinal section of the stem in FIGS. 6a) and 6b), the shaft 4 is held in the inner assembly 22 and is borne in the latter by means of an axial bearing 31. Moreover, the inner assembly 22 is configured so that it can be detachably coupled with the hand blender motor housing (not shown here), which simultaneously forms the handle for the user, no relative movement being allowed between motor housing and inner stem assembly 22 in the coupled state. This also connects the shaft 4 with the motor shaft via the shaft coupling 33.

At the lower end of the outer assembly 23 there is a bell-shaped shield 34 for the blade arrangement (cutter) 1 attached to the bottom end of the shaft 4, said blade arrangement preferably being completely enclosed by the shield (bell). On the inside, the shield has a cover plate 32, which, together with the shield 34, forms an operating space that is sealed off from the outer assembly 23. Furthermore, in the outer assembly there is a radial slide bearing 27 in close proximity to the cutter 1, since it is here that the torque is at its greatest. Here the radial slide bearing 27 is provided on the cover plate 32 of the shield 34, since these components are closest to the cutter 1. The radial slide bearing 27 is mounted in a flexible collar bushing 28, which is surrounded by a bearing sleeve 29, which fixes the bushing 28 and the radial slide bearing 27 on the cover plate 32. Radial slide bearing 27, collar bushing 28 and bearing sleeve 29 form a bearing assembly 30. The flexible collar bushing 28 allows a slight rotation of the radial slide bearing 27 around an imaginary fulcrum in the centre. If the motor portion (not shown here) is put onto the shaft, the shaft 4 is pushed coaxially to the motor shaft in the upper region via the shaft coupling. Due to manufacturing-related tolerances and the eccentricity of the motor to the adaption, a "rigidly" clamped shaft without flexible collar bushing would easily bend out of shape. In turn this would lead to increased wear of the bearing and a greater amount of noise during operation. The "soft" bearing with the aid of the flexible collar bushing 28 serves as a remedy in this case and the bearing assembly 30 with collar bushing 28 is therefore capable of compensating for the forces due to normal manufacturing tolerances or an eccentrically coupled motor.

A spring 24 located on the inside in the inner assembly 22 is supported at the bottom by means of a bearing assembly 30 with the radial slide bearing 27 on the outer assembly 23 and at the top abuts the inside of the inner assembly 22, so that it forces the two assemblies into a default position, in which the inner assembly 22 is pushed out of the outer assembly 23 at the top, thereby bringing the cutter 1 into its topmost position in the operating space (see FIG. 6a). The bearing assembly 30 is thereby held in position by the spring 24 pressing on the bearing sleeve 29. The limit stops for this travel are attached on the inside of the outer assembly 23 in the form of four longitudinal grooves 19 (longitudinal guides) distributed over the circumference. Ribs 20 (guide elements) attached on the outside of the inner assembly 22 run in said grooves. The four ribs 20, two of which can be seen in FIGS. 6a) and 6b), perform two functions and are divided into two opposing pairs. The one pair determines the end position of the inner assembly 22 in the default position imposed by the spring 24 and also serves for one-off latching behind during mounting of the assembly. The second pair of ribs prevents the inner assembly from twisting relative to the outer assembly ("misuse"). In an alternative (not shown), only two longitudinal grooves are provided on the inside of the outer assembly and accordingly two ribs on the outside of the inner assembly, one longitudinal groove-rib combination determining the axial limit position of the inner assembly and the other longitudinal groove-rib combination preventing mutual twisting of the two assemblies.

Since the requirements for coaxiality of the shaft coupling are high, centring ribs 35 are attached in the upper portion of the inner assembly 22 by way of a centring means and said centring ribs "pre-centre" the shaft radially within a narrow interval. This is helpful to facilitate "threading" the shaft coupling (not shown) on the motor housing onto the shaft coupling 33 of the stem. In the interests of functional integration, these centring ribs 35 also form the abutment surface of the axial bearing 31. Power transmission from the axial bearing 31 onto the shaft 4 is affected via a U-shaped washer 36 and a rolling on the shaft 4 (see FIGS. 3a and 3b). The rolling results in a constriction on the shaft and a bulge 37 in front of and behind the material displaced by the constriction that projects above the shaft diameter. This means that it no longer fits through the relatively close-fitting U-shaped washer. The shaft 4 is axially fixed in the inner assembly 22 by a safety washer 38 on the shaft 4 above the centring ribs 35 of the inner assembly 22. The outer assembly 23 further comprises a shaft seal 25, to reduce contamination from wetting of the shaft.

The bearing of the two assemblies 22 and 23 required for mutual axial displacement is provided at two places by slide bearings of simple geometry, wherein the half of the slide bearing provided at the lower end of the inner assembly 22 is represented by a broadening that partially protrudes above the circumference and the opposite half of the slide bearing is represented by a cylindrical slide sleeve attached to the inside of the outer assembly 23. The upper slide bearing at the top end of the inner assembly 22 is not visible in the cross-sectional views of FIGS. 6a) and b). However, one can see the projections distributed around the circumference, which are supported against a smooth bearing surface on the inside of the upper portion of the outer assembly 23. A possible slide pairing is between between two different plastics, the other possible slide pairing being between plastic and metal (e.g. stainless steel). The bearing points 26 are attached as far apart as the construction space allows, in order to prevent a self-locking effect in use.

Figure 6B:
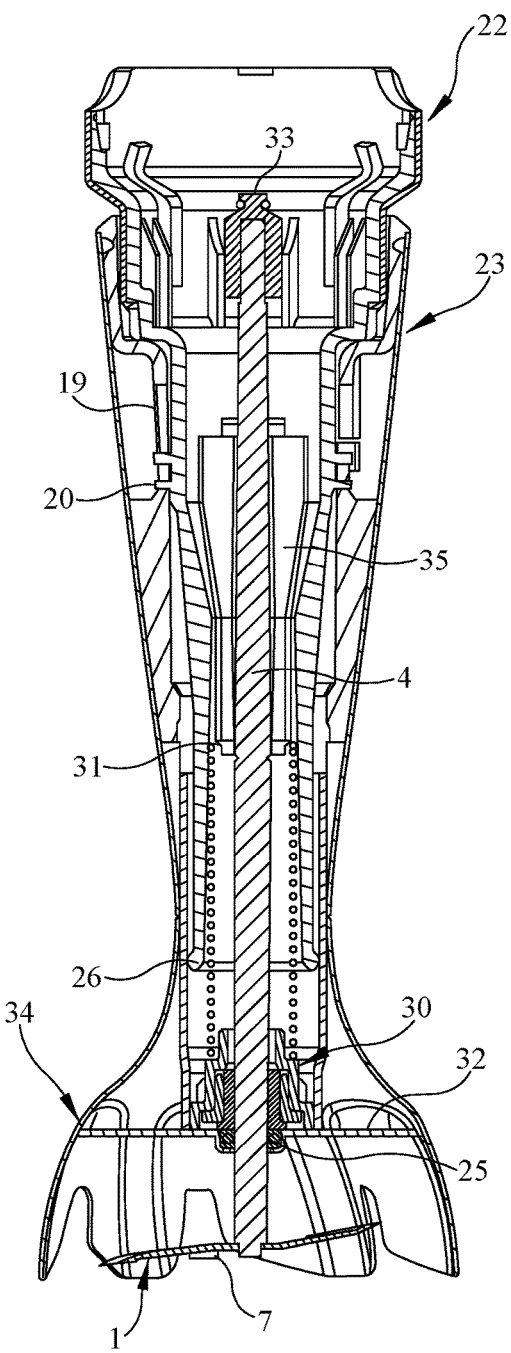

In the construction described above, the position of the cutter 1 in the starting position is further up than than the usual position (away from the container base) (FIG. 6a), in order to reduce suction on the container base and also, due to the division, the shaft allows an axial movement of the cutter 1 towards the container base against the force of the spring 24. If, during operation, the user presses axially on the motor housing that simultaneously serves as a handle and is connected to the inner assembly 22, then the mounted shaft is able to transfer this travel through the inner assembly 22 via the shaft 4 mounted in it in an axially rigid manner to the cutter. During this process, the external geometry of the outer assembly 23 can remain unchanged. To this end, the inner assembly 22 plunges a certain distance into the outer assembly 23 (FIG. 6b) until there the inner assembly 22 comes up against a defined limit stop formed by the interaction of longitudinal grooves 19 and ribs 20. Thus, in the default state, in which the user does not exert any pressure on the stem and the cutter 1 is in the uppermost position in the shield 34 in the operating area (FIG. 6a), the suction can be massively reduced and, at the same time, the working area of the cutter 1 can be increased downwards due to the travel that is possible in the axial direction, in order to reach inaccessible pieces of food, for example.

The invention claimed is:

1. A hand blender comprising a blade arrangement for a domestic appliance for cutting and comminuting food, the arrangement comprising a rotatable blade with a hub which lies at a centre of rotation of the blade for receiving a shaft, wherein said blade further comprises at least one cutter which extends radially and which comprises a cutting edge that lies on a front side in a rotational direction and defines a circular cutting zone when the blade is rotating, characterised in that the blade further comprises a milling rib which protrudes upwards from the blade in an axial direction and is oriented so as to produce a milling effect when rotating which defines a corresponding milling zone that extends from the hub to the cutting zone of the cutter, wherein the axial direction is a direction along a rotational axis of the blender, wherein the radial direction is perpendicular to the axial direction, wherein the milling rib faces downward when the hand blender is in use and, wherein the milling zone abuts up to but does not overlap the cutting zone.

2. The hand blender according to claim 1, wherein an attack angle of the milling rib is between 0° and 45°.

3. The hand blender according to claim 1, wherein the milling rib extends radially.

4. The hand blender according to claim 1, wherein the blade further comprises two opposite cutters and the milling rib extends over the centre of rotation of the blade.

5. The hand blender according to claim 1, wherein the cutting edge has a wedge angle of less than 45°.

6. The hand blender according to claim 1, wherein the milling rib extends from a position on an edge of the hub, which lies at an angle ($\alpha$) of about 45° to a radial central axis of the cutter relative to the centre of rotation, up to the cutting edge.

7. The hand blender according to claim 6, wherein a wedge angle between a rotational plane and a surface of the cutter continuously increases from 20° to 90° from the cutting edge towards the milling rib.

8. The hand blender according to claim 1, wherein the milling rib is arranged on a back side of the cutter in the rotational direction.

9. The hand blender according to claim 1, wherein a thickness of the milling rib corresponds to a thickness of the sheet forming the blade.

10. The hand blender according to claim 1, further comprising:
a drive motor arranged in a motor housing,
a stem, in which is mounted the shaft, which is connected in a torsionally rigid manner, wherein said stem is divided into an inner and an outer assembly, wherein the outer assembly comprises a shield at ends furthest from the motor housing, wherein said shield surrounding the blade is firmly connected to the shaft, and
wherein the shaft is routed in an axially rigid manner in the inner assembly and the inner assembly is axially moveable relative to the outer assembly.

11. The hand blender according to claim 10, wherein the shaft is mounted in the inner assembly via an axial bearing and power is transmitted from the axial bearing to the shaft via a locking device attached to the shaft.

12. The hand blender according to claim 10, wherein the outer assembly further comprises a radial slide bearing for the shaft at its end furthest away from the motor housing, wherein said slide bearing is supported in a flexible bushing relative to the outer assembly.

13. The hand blender according to claim 10, wherein an elastic element is provided between the inner and the outer assembly to axially pretension the outer assembly relative to the inner assembly.

14. The hand blender according to claim 1, wherein an attack angle of the milling rib is between 0° and 35°.

15. The hand blender according to claim 1, wherein the cutting edge has a wedge angle of less than 20°.

* * * * *